US007395293B1

(12) United States Patent
Szedo et al.

(10) Patent No.: US 7,395,293 B1
(45) Date of Patent: Jul. 1, 2008

(54) MEMORY SEGMENTATION FOR FAST FOURIER TRANSFORM

(75) Inventors: Gabor Szedo, San Jose, CA (US); Helen Hai-Jo Tarn, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 833 days.

(21) Appl. No.: 10/898,628

(22) Filed: Jul. 23, 2004

(51) Int. Cl.
*G06F 17/14* (2006.01)
(52) U.S. Cl. .................................................. 708/404
(58) Field of Classification Search .................. 708/404
See application file for complete search history.

(56) References Cited

U.S. PATENT DOCUMENTS

| | | | | |
|---|---|---|---|---|
| 4,868,776 A | * | 9/1989 | Gray et al. ................. | 708/405 |
| 2004/0039765 A1 | * | 2/2004 | Nakazuru et al. ........... | 708/404 |
| 2005/0114421 A1 | * | 5/2005 | Gibb et al. ................. | 708/404 |
| 2006/0004900 A1 | * | 1/2006 | Steinberg ................... | 708/404 |

* cited by examiner

*Primary Examiner*—David H Malzahn
(74) *Attorney, Agent, or Firm*—LeRoy D. Maunu; Lois D. Cartier

(57) ABSTRACT

Various approaches for performing a fast-Fourier transform (FFT) of N input data elements using a radix K decomposition of the FFT are disclosed (K>=2, and N>=8). In one approach, N/K input data elements are written to respective ones of K addressable memories, and $N/K * \log_K N$ passes are performed on the input data. Each pass includes reading K data elements in parallel from the K addressable memories using the respectively generated addresses, the K data elements being in a first order corresponding to the respective memories; permuting the first order of K data elements into a second order of K data elements; performing a radix K calculation on the second order of K data elements, resulting in corresponding result data elements in the second order; permuting the second order of K result data elements into the first order; and writing the K result data elements in parallel to the corresponding K addressable memories using the respective addresses.

23 Claims, 11 Drawing Sheets

| | J index values for inputs and outputs of radix-4 engines at N=16 | |
| --- | --- | --- |
| | Rank-0: $X(0,J), Y(0,J)$ | Rank-1: $X(1,J), Y(1,J)$ |
| Pass-0 | 0, 1, 2, 3 | 0, 4, 8, 12 |
| Pass-1 | 4, 5, 6, 7 | 1, 5, 9, 13 |
| Pass-2 | 8, 9, 10, 11 | 2, 6, 10, 14 |
| Pass-3 | 12, 13, 14, 15 | 3, 7, 11, 15 |

*FIG. 5*

| | Groups of K elements X(I,J) or Y(I,J) that must be accessed in parallel by a radix-K engine | Pass factor F for passes 0 to L-1 |
|---|---|---|
| Constraint for rank-0 l=0 | J={0, 1, 2, ..., K-1} + F | F= AK where A=0, 1, ..., L-1 |
| Constraint for rank-1 l=1 | J={0, K, 2K, ..., (K-1)K} + F | F= AK$^2$ + B where A=0, 1, ..., (L/K)-1; B=0, 1, ..., K-1 |
| Constraint for rank-2 l=2 | J={0, K$^2$, 2K$^2$, ..., (K-1)K$^2$} + F | F= AK$^3$ + B where A=0, 1, ..., (L/K$^2$)-1; B=0, 1, ..., K$^2$-1 |
| ... | ... | ... |
| Constraint for rank-l | J={0, K$^l$, 2K$^l$, ..., (K-1)K$^l$} + F | F= AK$^{l+1}$ + B where A=0, 1, ..., (L/K$^l$)-1; B=0, 1, ..., K$^l$-1 |
| ... | ... | ... |
| Constraint for rank-C-1 l= C-1 | J={0, K$^{C-1}$, 2K$^{C-1}$, ..., (K-1)K$^{C-1}$} + F | F= B where B=0, 1, ..., K$^{C-1}$-1 |

| Index J of element (N= 16) | Index J in base K= 4 | Memory ID (modulo K sum of base K digits) | Address In memory (J modulo N/K) |
|---|---|---|---|
| 0 | 00 | 0 | 0 |
| 1 | 01 | 1 | 1 |
| 2 | 02 | 2 | 2 |
| 3 | 03 | 3 | 3 |
| 4 | 10 | 1 | 0 |
| 5 | 11 | 2 | 1 |
| 6 | 12 | 3 | 2 |
| 7 | 13 | 0 | 3 |
| 8 | 20 | 2 | 0 |
| 9 | 21 | 3 | 1 |
| 10 | 22 | 0 | 2 |
| 11 | 23 | 1 | 3 |
| 12 | 30 | 3 | 0 |
| 13 | 31 | 0 | 1 |
| 14 | 32 | 1 | 2 |
| 15 | 33 | 2 | 3 |

| | Address (for N= 16, K= 4) | | | |
|---|---|---|---|---|
| | 0 | 1 | 2 | 3 |
| Memory-0 | 0 | 13 | 10 | 7 |
| Memory-1 | 4 | 1 | 14 | 11 |
| Memory-2 | 8 | 5 | 2 | 15 |
| Memory-3 | 12 | 9 | 6 | 3 |

FIG. 8

| | ADDRESS (FOR N=64, K=4) | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| MEMORY-0 | 0 | 5 | 10 | 15 | 17 | 20 | 27 | 30 | 34 | 39 | 40 | 45 | 51 | 54 | 57 | 60 |
| MEMORY-1 | 1 | 4 | 11 | 14 | 16 | 21 | 26 | 31 | 35 | 38 | 41 | 44 | 50 | 55 | 56 | 61 |
| MEMORY-2 | 2 | 7 | 8 | 13 | 19 | 22 | 25 | 28 | 32 | 37 | 42 | 47 | 49 | 52 | 59 | 62 |
| MEMORY-3 | 3 | 6 | 9 | 12 | 18 | 23 | 24 | 29 | 33 | 36 | 43 | 46 | 48 | 53 | 58 | 63 |

| Rank | Pass Address Digits | | | | | | |
|---|---|---|---|---|---|---|---|
| | | 6 | 5 | 4 | 3 | 2 | 1 | 0 |
| | 0 | $E_1$ | $E_2$ | $E_3$ | $E_4$ | $E_5$ | $E_6$ | R |
| | 1 | $E_5$ | $E_4$ | $E_3$ | $E_2$ | $E_1$ | R | $E_0$ |
| | 2 | $E_5$ | $E_4$ | $E_3$ | $E_2$ | R | $E_1$ | $E_0$ |
| | 3 | $E_5$ | $E_4$ | $E_3$ | R | $E_2$ | $E_1$ | $E_0$ |
| | 4 | $E_5$ | $E_4$ | R | $E_3$ | $E_2$ | $E_1$ | $E_0$ |
| | 5 | $E_5$ | R | $E_4$ | $E_3$ | $E_2$ | $E_1$ | $E_0$ |
| | 6 | R | $E_5$ | $E_4$ | $E_3$ | $E_2$ | $E_1$ | $E_0$ |
| | 7 | $E_6$ | $E_5$ | $E_4$ | $E_3$ | $E_2$ | $E_1$ | $E_0$ |

| Rank | Pass Address Digits | | | | | | |
|---|---|---|---|---|---|---|---|
| | | 6 | 5 | 4 | 3 | 2 | 1 | 0 |
| | 0 | $E_6$ | $E_5$ | $E_4$ | $E_3$ | $E_2$ | $E_1$ | $E_0$ |
| | 1 | $E_6$ | $E_5$ | $E_4$ | $E_3$ | $E_2$ | $E_1$ | R |
| | 2 | $E_6$ | $E_5$ | $E_4$ | $E_3$ | $E_2$ | R | $E_1$ |
| | 3 | $E_6$ | $E_5$ | $E_4$ | $E_3$ | R | $E_2$ | $E_1$ |
| | 4 | $E_6$ | $E_5$ | $E_4$ | R | $E_3$ | $E_2$ | $E_1$ |
| | 5 | $E_6$ | $E_5$ | R | $E_4$ | $E_3$ | $E_2$ | $E_1$ |
| | 6 | $E_6$ | R | $E_5$ | $E_4$ | $E_3$ | $E_2$ | $E_1$ |
| | 7 | R | $E_6$ | $E_5$ | $E_4$ | $E_3$ | $E_2$ | $E_1$ |

*FIG. 12*

MEMORY SEGMENTATION FOR FAST FOURIER TRANSFORM

FIELD OF THE INVENTION

The present invention generally relates to digital signal processing, and more particularly to the Fast Fourier Transform (FFT).

BACKGROUND

The fast Fourier transform (FFT) allows discrete samples of a signal to be transformed from the time domain to the frequency domain. The similar inverse fast Fourier transform (IFFT) transforms from the frequency domain to the time domain. FFT and IFFT are indispensable algorithms for digital signal processing in applications such as certain modems.

The calculation of an FFT is a complicated operation. An application may devote a significant portion of resources such as chip area and power consumption to calculation of an FFT. There is a general need for improvements to the FFT calculation that reduce resource consumption.

The present invention may address one or more of the above issues.

SUMMARY OF THE INVENTION

The invention provides various embodiments for performing a fast-Fourier transform (FFT) of N input data elements using a radix K decomposition of the FFT are disclosed (K>=2, and N>=8). In one embodiment, N/K input data elements are written to respective ones of K addressable memories, and $N/K*\log_K N$ passes are performed on the input data. Each pass includes reading K data elements in parallel from the K addressable memories using the respectively generated addresses, the K data elements being in a first order corresponding to the respective memories; permuting the first order of K data elements into a second order of K data elements; performing a radix K calculation on the second order of K data elements, resulting in corresponding result data elements in the second order; permuting the second order of K result data elements into the first order; and writing the K result data elements in parallel to the corresponding K addressable memories using the respective addresses.

In another embodiment, an apparatus is provided for performing a fast-Fourier transform (FFT) of N input data elements using a radix K decomposition of the FFT. The apparatus includes means for writing N/K input data elements to respective ones of K addressable memories and means for performing $N/K*\log_K N$ passes on the input data.

In another embodiment, a system is provided for performing a fast-Fourier transform (FFT) of N input data elements using a radix K decomposition of the FFT. The system includes K addressable memories adapted to receive as input N/K data elements. A first control arrangement is coupled to the addressable memories and is configured to generate K respective addresses for the K addressable memories, read K data elements in parallel from the K addressable memories using the respective addresses. The K data elements are in a first order corresponding to the respective memories, and the first controller permute the first order of K data elements into a second order of K data elements. At least one radix engine is coupled to the first control arrangement. The radix engine is configured to perform a radix K calculation on the second order of K data elements. A second control arrangement is coupled to the addressable memories and to the radix engine. The second control arrangement is configured to permute the second order of K result data elements into the first order and write the K result data elements in parallel to the corresponding K addressable memories using the respective addresses. A third control arrangement is coupled to the memories, to the first and second control arrangements, and to the radix engine. The third control arrangement is configured to control a number of iterations by the first and second control arrangements and the radix engine before outputting N/K data elements from respective ones of K addressable memories and inputting N/K new data elements.

In yet another embodiment, a system is provided for performing a fast-Fourier transform (FFT) of N input data elements using a radix K decomposition of the FFT. The system includes at least one programmable logic device configured to include the K addressable memories, the first control arrangement, at least one radix engine, the second control arrangement, and the third control arrangement.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings in which:

FIG. 5 is a table of the data elements needed by an example radix-4 engine for each pass of each rank for a 16 point FFT;

FIG. 6 is a table of the constraints that must be satisfied to allow a radix-K engine to access the data elements needed by each pass of each rank from K separate memories;

FIG. 7 is a table showing an example calculation of the memory identifier and address for the data elements in an embodiment of a 16 point radix-4 FFT;

FIG. 8 is a table summarizing the memory identifier and address for the data elements in an embodiment of an example 16 point radix-4 FFT;

FIG. 9 is a table summarizing the memory identifier and address for the data elements in an embodiment of an example 64 point radix-4 FFT;

FIG. 11 and FIG. 12 are tables showing example generation of the memory addresses for the 4 elements accessed during each pass of the computation phase of respective embodiments of a 65536 point radix-4 FFT.

DETAILED DESCRIPTION

Figure 1:
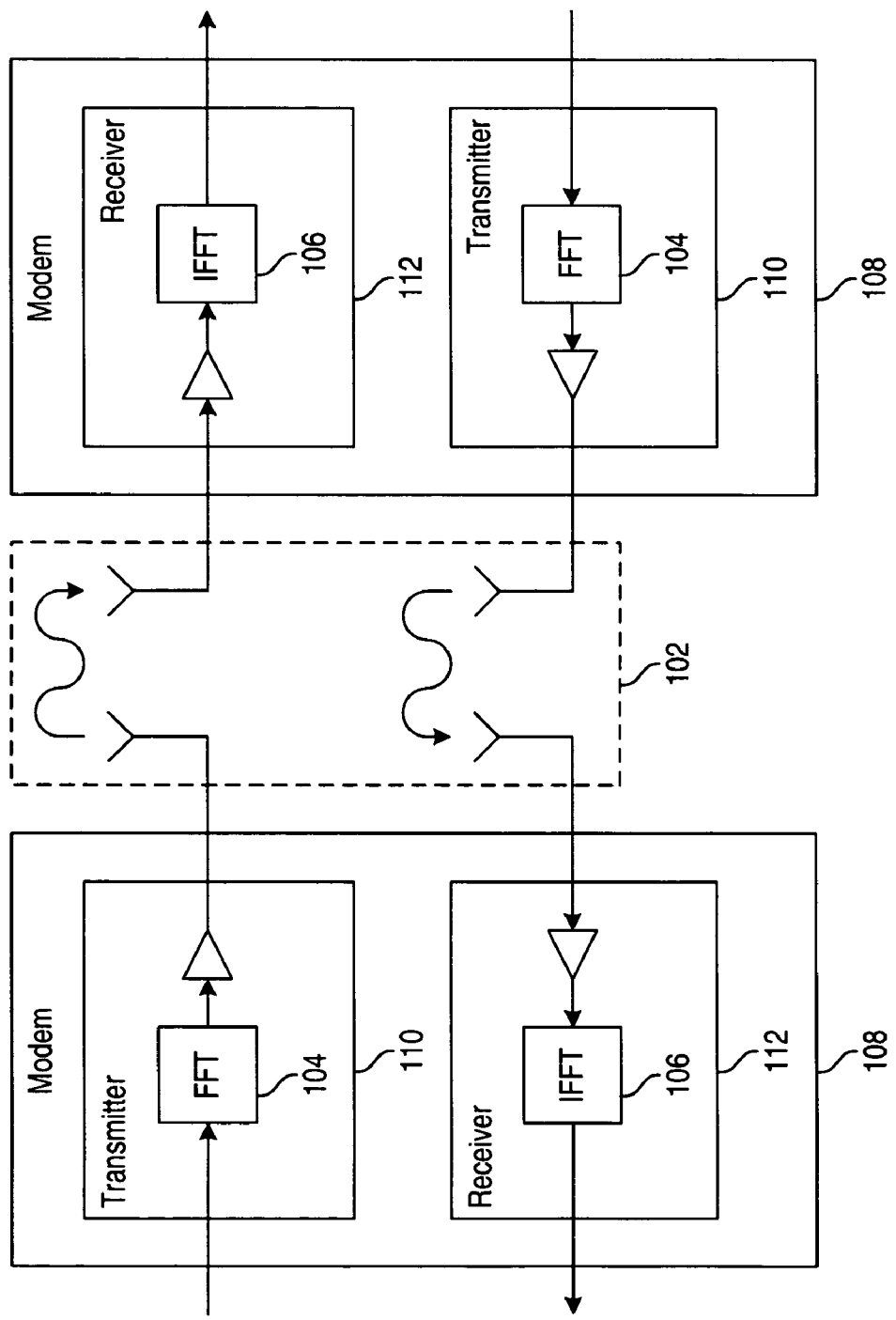
FIG. 1 is a system diagram of an example for a communication link employing an FFT and an IFFT.

FIG. 1 is a system diagram of an example for a communication link 102 employing a fast Fourier transform (FFT) 104 and an inverse fast Fourier transform (IFFT) 106. The communication link 102 may use wireless communication such as radio frequency communication. Alternatively, wired communication may be used.

Modems 108 are deployed at ends of the communication link 102. Each of modems 108 performs the modulation and demodulation for the communication protocol. The modulation is performed by the transmitter 110 of each modem 108 and the demodulation is performed by the receiver 112 of each modem 108. For certain communication protocols such as orthogonal frequency division multiplexing (OFDM) the modulation by the transmitter 110 may be performed by an FFT 104, and the demodulation by the receiver 112 may be performed by an IFFT 106.

An N-point FFT or IFFT converts N input values into N output values. A series of N transmit data values may be converted into N transmit frequencies by the FFT 104 modulator of the transmitter 110 of one modem 108, and then the corresponding N received frequencies may be converted back into a series of N received data values by the IFFT 106 demodulator of the receiver 112 of the other modem 108. The accuracy of the transformation process for an FFT and an IFFT depends upon the number of samples, N, for data values and frequencies. For OFDM applications in fourth generation wireless communications such as cellular telephony, the value of N may be 1024 samples.

The calculations needed to compute an FFT 104 are similar to the calculations needed to compute an IFFT 106. Minor enhancements allow the same circuit to calculate either an FFT 104 or an IFFT 106 as desired. An example modem 108 may use one circuit to calculate both the transmit FFT 104 and the receive IFFT 106.

Certain modems are one example of the value of FFT and IFFT algorithms. These algorithms are of general utility in a wide variety of digital signal processing applications.

For clarity, the following discussion refers only to FFT calculations. It will be appreciated that the following discussion is also applicable to IFFT calculations.

Figure 2:
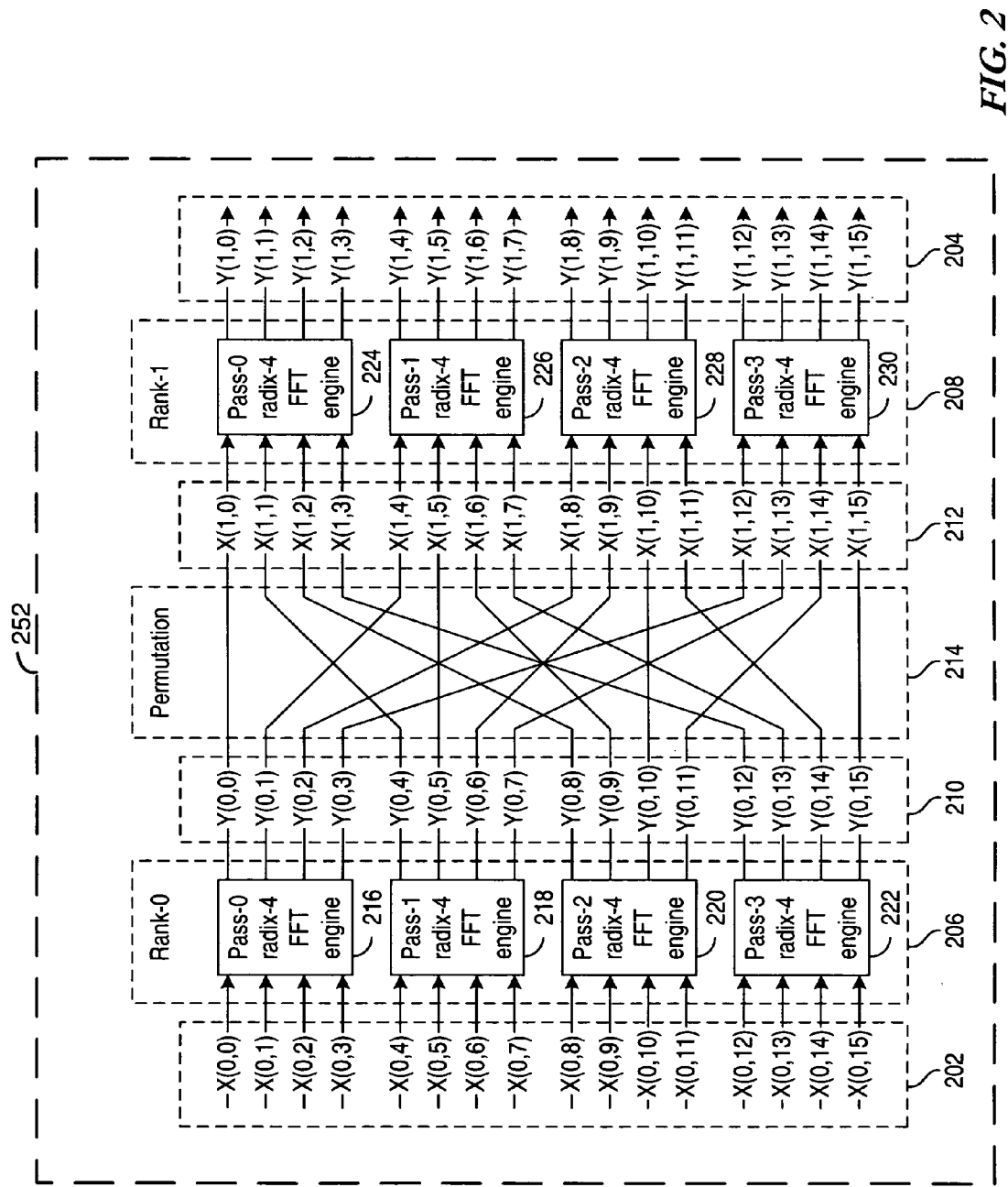
FIG. 2 is a block diagram of a radix-4 decomposition of a 16 point FFT.

FIG. 2 is a block diagram of a radix-4 decomposition of a 16-point FFT. The 16-point FFT has N equal to 16, with 16 input data samples (dashed block 202) denoted, $X(0,J)$, $0<=J<N$, and 16 output frequencies (dashed block 204) denoted, $Y(1,J)$, $0<=J<N$.

A radix-K Cooley-Tukey decomposition of an N-point FFT decomposes the FFT calculation into $\log_K N$ ranks. For the radix-4 decomposition of a 16 point FFT there are $\log_4 16=2$ ranks, rank-0 (dashed block 206) and rank-1 (dashed block 208). In general rank-I, $0<=I<\log_K N$, has N input elements denoted, $x(I,J)$, $0<=J<N$, and N output elements denoted, $Y(I,J)$, $0<=J<N$. Thus rank-0 206 has 16 input elements (block 202), $X(0,J)$, $0<=J<N$, and 16 output elements (block 210), $Y(0,J)$, $0<=J<N$; rank-1 (block 208) has 16 input elements (block 212), $X(1,J)$, $0<=J<N$, and 16 output elements (block 204), $Y(1,J)$, $0<=J<N$.

The input elements 202 to the first rank 206 are the inputs to the 16 point FFT, and the output elements 204 from the last rank 208 are the outputs from the 16 point FFT. The output elements 210 of rank-0 206 are permuted by data permutation 214 to form the input elements 212 of rank-1 (block 208).

For a Cooley-Tukey decomposition, each rank is composed of N/K passes of a radix-K FFT engine. For a radix-4 decomposition of a 16 point FFT, each rank is composed of 16/4=4 passes of a radix-4 engine. Rank-0 (block 206) is composed of the 4 pass engines 216, 218, 220, and 222, and rank-1 208 is composed of the 4 pass engines 224, 226, 228, and 230. The radix-4 decomposition of a 16 point FFT has a total of 8 passes of the radix-4 engine (engines 216, 218, 220, 222, 224, 226, 228, and 230).

An embodiment of a radix-4 decomposition of a 16 point FFT may have only one hardware radix-4 FFT engine, with the radix-4 engine time multiplexed to successively perform the computations of each of pass engines 216, 218, 220, 222, 224, 226, 228, and 230. The evaluation order for the passes for the multiplexed radix-4 engine may be engine 216, engine 218, engine 220, engine 222, engine 224, engine 226, engine 228, and engine 230.

Another embodiment of a radix-4 decomposition of a 16 point FFT may have one hardware radix-4 FFT engine for each rank, with one radix-4 engine time multiplexed to successively perform the computations for pass engines 216, 218, 220, and 222, and with the other radix-4 engine time multiplexed to successively perform the computations for pass engines 224, 226, 228, and 230. Operating the two radix-4 engines in a pipelined manner allows increased FFT calculation throughput.

The various embodiments of the invention as illustrated in the block diagrams (FIG. 2, for example) and flow diagrams may be realized in any implementation-suitable hardware platform. For example, the various functions may be realized in one or more ASICs, programmable logic devices (PLDs), dedicated processors, RISC processors, general-purpose processors, or various combinations thereof. For purposes of illustration, block 252 shows an example platform on which the functions may be implemented. The reprogrammability and other features of a field programmable gate array (FPGA) may make an FPGA an especially suitable PLD for realizing the various functions. It will be appreciated that the functions and components described in the other figures may also be realized on the aforementioned platforms, even though no specific platforms are shown in the other figures.

Figure 3:
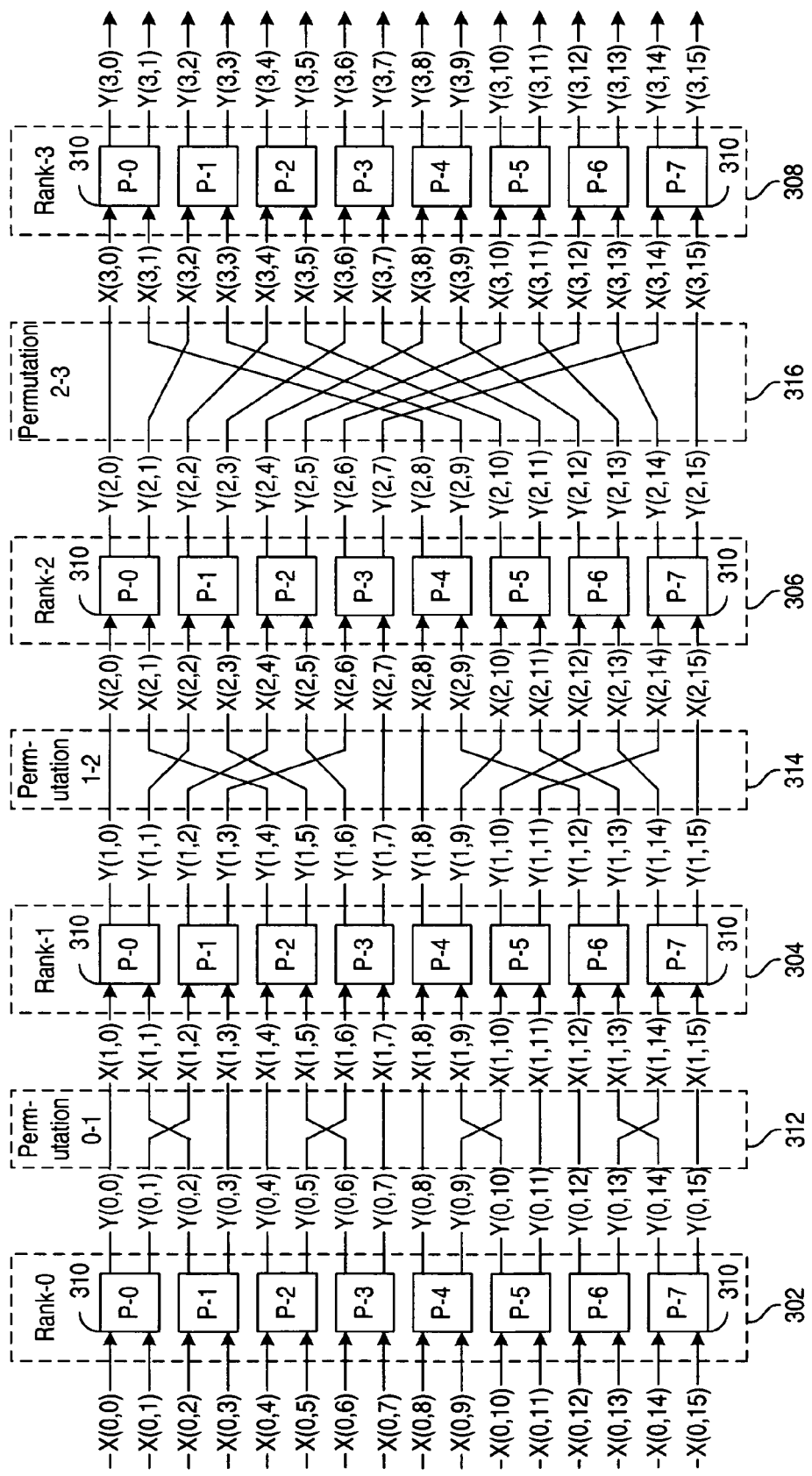
FIG. 3 is a block diagram of a radix-2 decomposition of a 16 point FFT.

FIG. 3 is a block diagram of a radix-2 decomposition of a 16 point FFT. This decomposition may calculate the same 16 point FFT as the prior figure, but using a different Cooley-Tukey decomposition. The decomposition has 4 ranks, rank-0 (block 302), rank-1 (block 304), rank-2 (block 306), and rank-3 (block 308), with each rank containing 8 radix-2 FFT engine passes 310.

Between the ranks the elements are permuted by 3 data permutations, permutation-0-1 (block 312), permutation-1-2 (block 314), and permutation-2-3 (block 316). Each data permutation 312, 314, and 316 performs a distinct permutation of the output elements of the previous rank to form the input elements of the following rank.

In an embodiment that time multiplexes a single hardware radix-K FFT engine, each pass requires K input elements and produces K output elements. The input and output elements for the passes may be stored in one or more memory banks. The various permutations, such as 312, 314, and 316, produce an intricate access pattern to the memory banks for the K input elements and K output elements of the passes. This intricate access pattern changes dramatically from rank to rank.

Generally, the intricate access pattern has resulted in using at least two memory banks for an FFT calculation with a multiplexed radix-K engine. In addition, the intricate access pattern has resulted in varying element memory addresses between ranks, with each output element $Y(I,J)$ of a rank generally stored at a different address than the corresponding input element $X(I,J)$. In contrast, various embodiments of the invention allow a single memory bank having static element addresses for an FFT calculation with a multiplexed radix-K engine. Because of the static element addresses, for a given value of J, the elements $X(I,J)$ and $Y(I,J)$ may be stored in the same memory bank location for all values of I. Thus the location for an element may be determined solely from the element index J, $0<=J<N$. The resources required for the FFT calculation are reduced by eliminating an extra memory bank and by the static element addressing.

In an example prior approach for performing an FFT calculation with a multiplexed radix-K engine, one memory bank holds the input elements for a rank and a second memory bank holds the output elements for a rank, with the two memory banks swapping roles after all passes have been calculated for a rank. After the FFT computation phase there may be a separate access phase to unload the outputs of the FFT computation while loading the inputs for the next FFT computation. Various embodiments of the present invention use only one memory bank to perform an FFT calculation for a multiplexed radix-K engine with separate phases for computation and access.

In another example prior approach for performing an FFT calculation with a multiplexed radix-K engine, three memory banks are used, allowing the overlapping of the computation and access phases. One access memory bank is used for unloading of outputs and loading of inputs while the other two computation memory banks are swapping roles between ranks of passes. After the completion of an FFT calculation, the access memory bank swaps roles with one of the computation memory banks and the next FFT calculation begins with minimal delay. Various embodiments of the present invention use only to memory banks to perform this type of FFT calculation for a multiplexed radix-K engine with overlapped computation and access.

Figure 4:
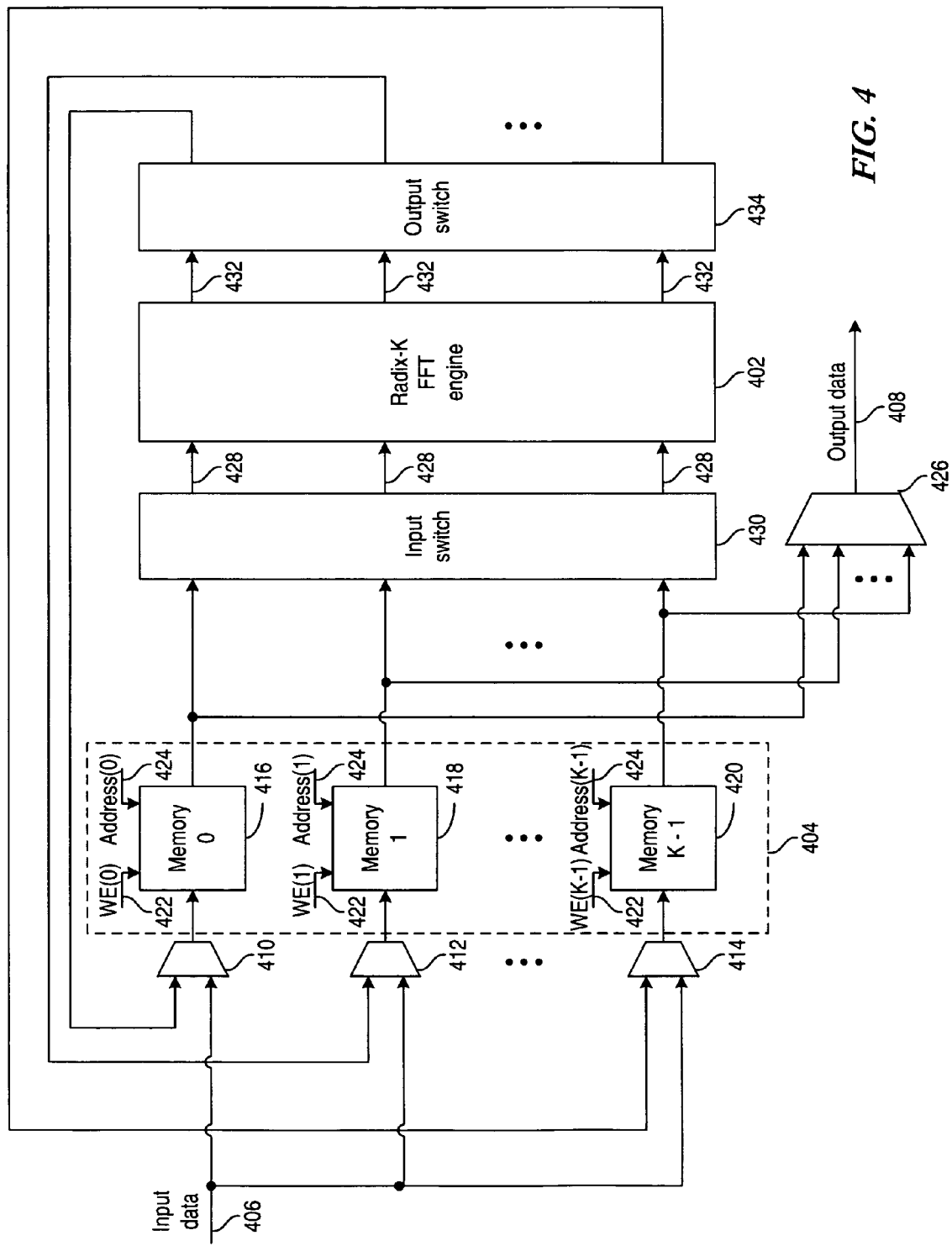
FIG. 4 is a block diagram of an embodiment using one radix-K engine to calculate an N point FFT.

FIG. 4 is a block diagram of an embodiment using one radix-K engine 402 to calculate an N-point FFT. A single memory bank 404 may hold the FFT calculation inputs and outputs, and also the intermediate elements for the FFT computation. The FFT calculation may have separate access and computation phases.

During the access phase, the input data on line 406 for the next FFT calculation are loaded while the output data on line 408 from the previous FFT calculation are unloaded. Also during the access phase, the multiplexers 410, 412, and 414 are steered to present the input data from line 406 to the memories 416, 418, and 420 of memory bank 404. The memory bank 404 is segmented such that each of the K memories 416, 418, and 420 holds N/K of the N inputs 406 for the FFT calculation. Each of the N inputs is written into one of the K memories 416, 418, or 420 as selected by a write enable signal on line 422. A memory is selected from the element index J, $0<=J<N$, according to embodiments of the invention as is later discussed in detail. In one embodiment, during the access phase the address on line 424 for the K memories 416, 418, and 420 may be provided from a counter that increments after the loading of each input data 406.

In addition, during the access phase the output data on line 408 are unloaded. As each input data on line 406 is loaded into a location in one of the memories 416, 418, and 420 of memory bank 404, an output is unloaded from the same location of the same memory. In one embodiment, time multiplexing is used with single port memories 416, 418, and 420 to first read an output from a location in a memory of memory bank 404 and second, write an input to the same location in the same memory. In another embodiment, the memories 416, 418, and 420 of memory bank 404 may be dual ported memories. Multiplexer 426 steers each of the N outputs for the FFT calculation from the appropriate memory of the memory bank 404.

The computation phase has $(N/K)\log_K N$ passes. For each pass of the computation phase, the K input elements on lines 428 for the pass are read from memory bank 404 via input switch 430, with one of the input elements read from each of the K memories 416, 418, and 420. These input elements are processed by the radix-K engine 402 to produce output elements on lines 432 that are returned to the memory bank 404 via output switch 434. During the computation phase, the multiplexers 410, 412, and 414 are steered to circulate output elements on lines 432 from the output switch 434 back to the memory bank 404.

The input switch 430 performs a permutation to produce the K input elements on lines 428. The output data on lines 428 result from selections made by and addresses generated by the input switch 430 of the memories 416, 418, and 420 in the memory bank 404. The selected memory and address on lines 424 are calculated from the pass index P, $0<=P<N/K$, as discussed below in detail. In general, the addresses to the memories 416, 418, and 420 may be different. The output switch 434 permutes the K output elements 432 with a permutation that reverses the permutation of the input switch 430. In one embodiment, the input switch 430 performs a pass dependent rotation by one of the K possible rotations to generate the K input elements, and the output switch 434 performs the reverse rotation.

The various embodiments of the invention allow the K input elements (lines 428) for a pass to be read in parallel from the memory bank 404, and allow the K output elements (lines 432) for the pass to be written in parallel to the memory bank 404. When the output elements are written in parallel via output switch 434, the write enable on lines 422 is asserted for all memories 416, 418, and 420 of memory bank 404.

An alternative embodiment of the invention has two memory banks to allow overlapping FFT computation with access to FFT calculation inputs and outputs. While one memory bank is being used for unloading of outputs from the previous FFT calculation and loading of inputs for the next FFT calculation, the other memory bank is being used for the FFT computation. The memory banks may switch roles after the completion of both the FFT calculation using one memory bank and the unloading and loading using the other memory bank.

FIG. 5 is a table 500 of the data elements needed by an example radix-4 engine for each pass of each rank for a 16 point FFT. A radix-4 FFT engine consumes 4 input elements and produces 4 output elements for each pass of each rank. For a pass of rank-I (I=0 or 1), 4 input elements X(I,J) are consumed for 4 values of the index J, and 4 output elements Y(I,J) are produced for the same 4 values of the index J. For example, pass-3 of rank-1 consumes X(1, 3), X(1, 7), X(1, 11), and X(1, 15) and produces Y(1, 3), Y(1, 7), Y(1, 11), and Y(1, 15). A table entry for a column (rank-I (I=0 or 1)) and a row (rows pass-0 through pass-3) includes the 4 values of the index J for the inputs elements X(I,J) consumed and the output elements Y(I,J) produced for the pass of rank-I.

An example embodiment for calculating a 16-point FFT with a radix-4 engine has a memory bank with 4 memories. The 4 input elements for the radix-4 engine may be read in parallel from the memory bank by reading the elements from the 4 respective memories. Similarly the 4 output data elements may be written in parallel to the memory bank by writing the elements to the 4 respective memories.

Constraints are provided by each entry in table 500 for the elements that must be stored in different memories. For example, pass-3 of rank-1 constrains input elements X(1, 3), X(1, 7), X(1, 11), and X(1, 15) to be stored in different memories and constrains output elements Y(1, 3), Y(1, 7), Y(1, 11), and Y(1, 15) to be stored in different memories.

FIG. 6 is a table 510 of the constraints that must be satisfied to allow a radix-K engine to access the data elements needed by each pass of each rank from K separate memories. To calculate an N-point FFT using a multiplexed radix-K engine requires $C=\log_K N$ ranks and with each rank having $L=N/K$ passes. Thus, there are CL constraints that must be satisfied to access the data elements for each pass of each rank from K separate memories. Table 510 summarizes these CL constraints.

Each of the C rows of table 510 contains L constraints for the L passes of the corresponding rank. The L constraints of each row for a rank are enumerated by the L values for the pass factor F given by column 512. For the L values of the pass factor F of a row, the constraints for the K elements that must be stored in separate memories are given by column 514. For example, the rank-0 (I=0) row 516 has constraints on the index J for the sets of data elements that must be in separate memories of {0, 1, 2, . . . K−1}+F, where F=AK for A=0, 1, . . . L−1. The pass factor F is added to each element of the set, so expanding the pass factor F yields the constraints on index J of {0, 1, 2, . . . K−1} for F=0K, {K, K+1, K+2, . . . 2K−1} for F=1K, et cetera. Thus, the data elements with index J from each set {0, 1, 2, . . . K−1}, {K, K+1, K+2, . . . 2K−1}, et cetera, must be stored in separate memories.

By introducing a base K representation for the element index J, the constraints of table 510 may be collapsed into a single constraint. The base K representation of the element index J has C=$\log_K$ N base K digits. The constraint from rank-0 (I=0) row 516, {0, 1, 2, . . . K−1}+F for F=0, K, 2K, . . . N−K is equivalent to the constraint that two elements must be stored in separate memories when the base K representations of the two element indices are identical for all digits excepting the least significant digit. In general, the constraint for row I for rank-I of table 510 is equivalent to the constraint that two elements must be stored in separate memories when the base K representations of the two element indices are identical for all digits excepting the I-th digit.

The constraints of table 510 collapse into the single constraint that elements must be stored in separate memories when the element indices are identical for any C−1 of the C digits in the base K representations of the element indices. Equivalently, the constraints of table 510 collapse into the single constraint that elements must be stored in separate memories when the element indices differ by just one digit in the base K representations.

The collapsed constraint provides a constraint independent of the rank I because the collapsed constraint is dependent only on the element index J. In addition, the collapsed constraint is independent of whether the element is an input element or an output element. Thus, input and output elements from different ranks sharing a common element index J may be stored in the same memory, as may be done in various embodiments of the invention. Accordingly, subsequent usage of the term "element with index J" refers to the group of elements X(I,J) and Y(I,J) for that value of J and all values of I.

In one embodiment the collapsed constraint is satisfied by storing an element with index J in the memory with a memory identifier, M, that is given by the modulo K sum of the digits of a base K representation of J. With J=$D_{C-1}K^{C-1}$+ . . . + $D_2K^2$+$D_1K$+$D_0$, the memory identifier is:

$$M = \left(\sum_{U=0}^{C-1} D_U\right) \text{MOD} K.$$

In an embodiment with multiple memory banks, M may be a segment identifier that identifies a memory in combination with a memory bank identifier.

Consider two element indices that are identical for C−1 of the digits $D_U$. The respective memory identifier for these two elements is the differing digit added modulo K to a shared value for the modulo K sum of the identical C−1 digits. Because this shared value is less than K, the memory identifiers have different values.

The elements are segmented by the memory identifier into segments of N/K elements. Because the segments may be identical for the inputs and outputs of all ranks, the segmentation is a static segmentation.

In another embodiment the collapsed constraint is satisfied by storing an element with index J in the memory with memory identifier given by the bitwise XOR of the binary representations for the digits of a base K representation of J.

FIG. 7 is a table 520 showing an example calculation of the memory identifier and address for the data elements in an embodiment of a 16-point radix-4 FFT. Each element index J for the 16 data elements is given in column 522. The base 4 representation for each index is given by two base 4 digits in column 524. The modulo 4 sum of the base 4 digits is given in column 526, and in one embodiment column 526 provides the memory identifier for each element.

In one embodiment, calculation of an address location for the element in the appropriate memory is given in column 528 as the index J modulo (16/4).

FIG. 8 is a table 530 summarizing the memory identifier and address for the data elements in an embodiment of an example 16-point radix-4 FFT. A table 530 entry contains the index value J for the element that is stored in the memory and location in this memory given by the memory for the row and the address of the column.

FIG. 9 is a table 540 summarizing the memory identifier and address for the data elements in an embodiment of an example 64-point radix-4 FFT. The memory identifier may be calculated as the bitwise XOR of the values for a binary representation for the base K digits of the element index J, and the memory address may be calculated as J DIV K, where DIV is integer division.

In general, the base K representation of a memory address for an element index J may be generated by deleting any one base K digit from the base K representation of J. A memory address of J modulo (N/K) deletes the most significant digit and a memory address of J DIV K deletes the least significant digit.

Consider a given memory location in a given memory. The address of the given memory location may provide C−1 of the C digits for the base K representation of the index of the element J assigned to that memory location. The memory identifier for the given memory in combination with these C−1 known digits may determine the value of the remaining digit. Thus exactly one element with index J is assigned to any given memory location in a given memory when the elements are assigned to a memory by a checksum operation over the C digits of the base K representation of the element index J, and the elements are assigned a memory address by deleting one digit from the base K representation of the element index J.

A checksum operation over C base K digits yields a checksum digit in base K. The value of any one of the C digits may be determined from the checksum digit and the remaining C−1 digits. Example checksum operations are the modulo K sum of the C base K digits and the bitwise XOR of the C binary representations for each of the base K digits.

The checksum operation to generate the memory identifier and the digit to delete to generate the memory address may be independently selected in various embodiments of the invention. The selected checksum operation may affect the element permutation performed by the input switch and the output switch. The selected deletion digit may affect the memory address generation.

The input switch performs a permutation of the elements read from the K memories, and the output switch reverses this permutation. Only K of the K factorial possible permutations may need to be performed by each switch. For a checksum operation of the modulo K sum of the base K digits of J, the input switch may rotate the elements. The rotation amount varies by the pass with each pass using one of the K possible rotation amounts.

Table 540 illustrates the K permutations of the input switch for a checksum operation of the bitwise XOR of a binary representation of the digits of J. Pass-0 of rank-0 requires elements 0, 1, 2, and 3, pass-1 of rank-0 requires elements 4, 5, 6, and 7, pass-2 of rank-0 requires elements 8, 9, 10, and 11, and pass-3 of rank-0 requires elements 12, 13, 14, and 15. These 4 passes illustrate the 4 permutations that need to be performed by the input switch for an XOR based checksum operation to sort the order of the elements. Each of the 16 passes of the 3 ranks uses one of these 4 permutations, independent of the rank.

Figure 10:
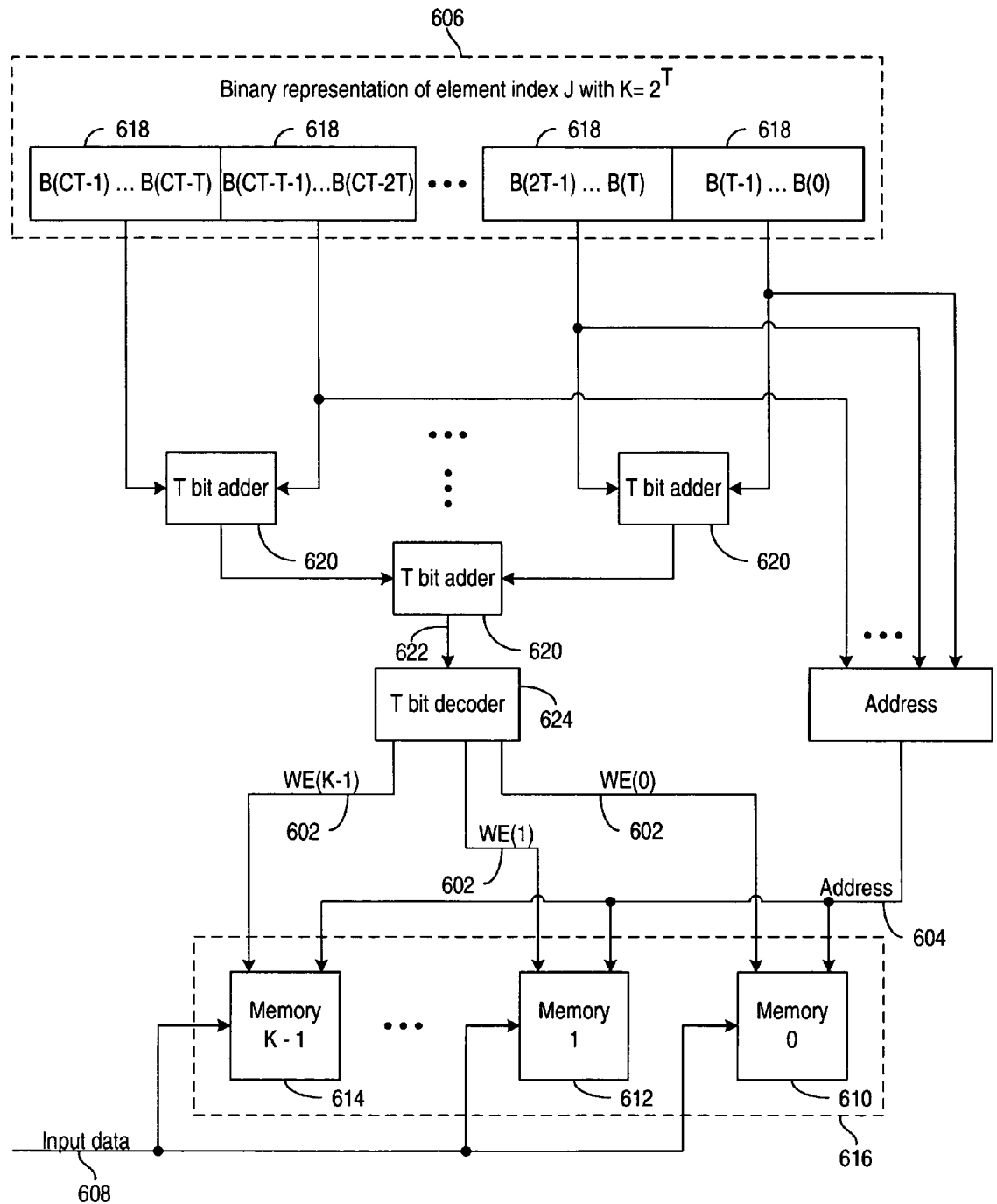
FIG. 10 is a block diagram of an embodiment to calculate the individual memory enables and address within a memory from the element index.

FIG. 10 is a block diagram of an embodiment to calculate the individual memory enable signals (lines 602) and address (line 604) within a memory from the element index 606. The calculated memory enable signals and address are used during the access phase to load input data (line 608) into the memories 610, 612, and 614, of memory bank 616. The calculated memory enable signals and address may also be used to unload output data. Similar logic may be used during the computation phase to determine the switch permutation based on a pass index P, 0<=P<N/K.

The element index J may have a binary representation as illustrated represented by block 606. During loading of input data (line 608) in the access phase, the element index J may be a counter that increments after each input is loaded. The binary representation 606 for an element index J may be partitioned into $C=\log_K N$ fields (blocks 618). For a K that is a power of 2, $K=2^T$, each of the C fields has T bits and encodes one of the digits of the C digit representation of the index J 606 in base K. In one embodiment the memory identifier (line 622) is formed by summing these C digits (from blocks 618) modulo K. The digits may be summed by a tree of adders 620 that may be a balanced tree. Each of adders 620 adds two T bit digits modulo K. The adders 620 may add modulo K with a T-bit result by not calculating or by discarding a carry out.

In another embodiment, the memory identifier (line 622) is formed by a bitwise XOR of the binary representations of the base K digits (blocks 618) of the index J (block 606). This may be accomplished by appropriately replacing each of T-bit adders 620 with T two-input XOR gates.

The result (line 622) of the modulo K addition of the digits of a base K representation of J (block 606) is input into a T-bit decoder 624. The T bit decoder 624 generates one asserted write enable signal on lines 602 that enables one coupled memory of the K memories 610, 612, 614 in memory bank 616 to write the input data 608 at an address 604. In one embodiment, the address on line 604 is provided by the C−1 least significant digits (blocks 618) of the base K representation of the index J. In another embodiment, the address is provided by the C−1 most significant digits of the index J. The address may be provided by any C−1 of the C digits of the index J in an alternative embodiment.

In one embodiment for a K that is not a power of two, each of the C fields (blocks 618) for the element index J encodes a digit of the base K representation, and the element index J is not a binary representation.

FIG. 11 and FIG. 12 illustrate tables 710 and 720 showing example generation of the memory addresses for the 4 elements accessed during each pass of the computation phase of respective embodiments of a 65,536-point radix-4 FFT. The 4 addresses are enumerated by the address enumerator, R, having the values 0, 1, ... K−1. The K memory addresses are calculated from the address enumerator R and a pass index, P, that increments for each pass within a rank. For K that is a power of 2, K=2, the pass index P has $\log_K(N/K)=C-1$ digits in the base K representation of P, and each digit has a T bit binary representation. Thus, $P=E_{C-2}K^{C-2}+\ldots+E_2K^2+E_1K+E_0$, with each $E_V$ having a T bit binary representation. Note that the elements KP, KP+1, ... KP+K−1 are the values of the element index J for the elements accessed by pass P, and $E_0$ equals $D_1$, et cetera. For N=65, 336 and K=4, P has the seven base 4 digits, $E_6, E_5, E_4, E_3, E_2, E_1$, and $E_0$, with each digit having a 2-bit binary representation.

Each pass of the radix-4 engine accesses 4 elements. The 4 addresses collectively needed to access these elements are shown in the tables 710 and 720 for respective embodiments.

Table 710 shows the 4 addresses needed to access the elements during the passes of the computation phase for an embodiment in which an element with index J is assigned to the memory address given by J modulo (N/K) for N=65, 536 and K=4. For example, row 712 for rank-0 gives the 4 addresses for a pass as: $E_1 4^6+E_2 4^5+E_3 4^4+E_4 4^3+E_5 4^2+E_6 4+R$, for the four values of the address enumerator R. The addresses change from rank to rank. For rank-7, row 714, the addresses are independent of R. Thus the same address value is used for each of the 4 memories.

While Table 710 provides the 4 addresses to access the elements for a pass, the address generated for one of the 4 respective values of R is not generally directly sent to a corresponding memory. The addresses are first permuted in a manner that parallels the permutation by the output switch. The permutation may be determined by the memory identifier M for any one of the elements accessed in the pass. In one embodiment, the permutation for a pass is calculated by the checksum operation from the base K digits of the pass index as:

$$Q = \left(\sum_{V=0}^{C-2} E_V\right) \text{MOD} K$$

The permutation selector Q has one of K values to select one of K permutations by the input and output switch. Logic similar to the logic used to calculate M (line 622 in FIG. 10) may be used to calculate Q. It will be appreciated however, that C base K digits are used to calculate M while C−1 base K digits are used to calculate Q. In one embodiment, during the access phase the pass index P holds the C−1 most significant digits of the element index J and the memory identifier M is calculated from Q by an additional iteration of the checksum operation referencing the least significant base K digit of J, $D_0$. In another embodiment, during the computation phase the element index J increments by K each pass with the least significant digit is set to zero, resulting in Q for the computation phase equaling M.

FIG. 12 table 720 shows the 4 addresses needed to access the elements during the passes of the computation phase for an embodiment assigning element with index J to the memory address given by J DIV K. In general the addresses needed to access the elements during the passes of the computation phase are dependent upon the digit that the embodiment deletes from the base K digit representation of the element index J to generate the assigned address of the element.

Figure 13:
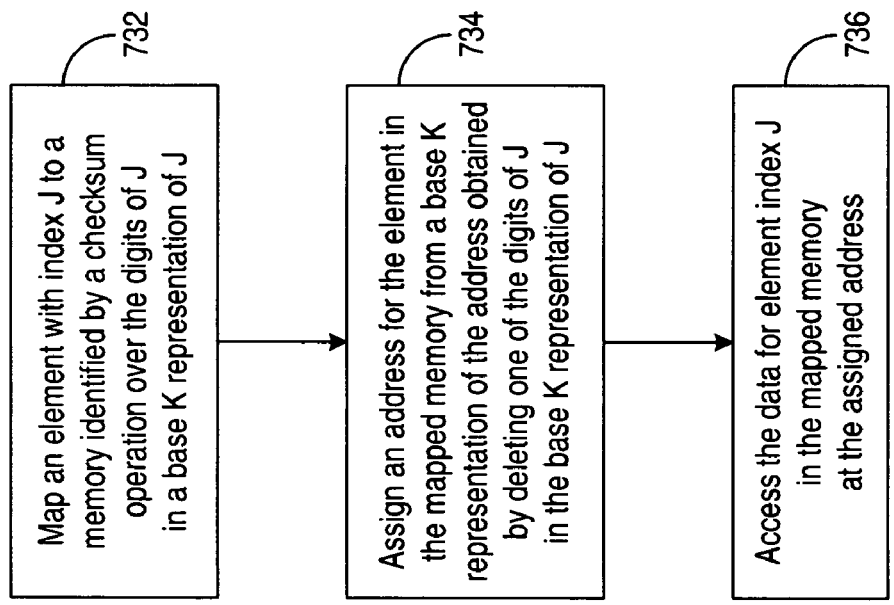
FIG. 13 is a flow diagram of an embodiment for a process to calculate a memory identifier and an address from an element index for an N point radix-K FFT decomposition.

FIG. 13 is a flow diagram of an embodiment for a process to calculate a memory identifier and an address from an element index for an N point radix-K FFT decomposition. At step 732, each of N elements with element index J is mapped to one of K memories as given by a checksum operation over the C digits of a base K representation of the element index J. At step 734 an address location for the element within this memory is assigned from the element index J by deleting one of the C base K digits of the element index J to produce a C−1 digit representation of the assigned address. At step 736 the data for the element with element index J is accessed in the mapped memory at the assigned address.

The present invention is believed to be applicable to a variety of systems for computing FFTs and has been found to be particularly applicable and beneficial in computing FFTs using parallel memory arrangements. Other aspects and embodiments of the present invention will be apparent to those skilled in the art from consideration of the specification and practice of the invention disclosed herein.

It is intended that the specification and illustrated embodiments be considered as examples only, with a true scope and spirit of the invention being indicated by the following claims.

What is claimed is:

1. A method for performing a fast-Fourier transform (FFT) of N input data elements using a radix K decomposition of the FFT, wherein K is greater than or equal to 2, and N is greater than or equal to 8, comprising:
   writing N/K input data elements to respective ones of K addressable memories;
   performing N/K*$\log_K$ N passes, each pass including (a)-(f),
   (a) generating K respective addresses for the K addressable memories;
   (b) reading K data elements in parallel from the K addressable memories using the respective addresses, the K data elements being in a first order corresponding to the respective memories;
   (c) permuting the first order of K data elements into a second order of K data elements;
   (d) performing a radix K calculation on the second order of K data elements, resulting in corresponding result data elements in the second order;
   (e) permuting the second order of K result data elements into the first order; and
   (f) writing the K result data elements in parallel to the corresponding K addressable memories using the respective addresses; and
   reading N/K data elements from respective ones of K addressable memories.

2. The method of claim 1, further comprising:
   identifying each pass with a pass counter; and
   wherein generating the K respective addresses includes generating each address as a function of the pass counter.

3. The step of claim 1, wherein permuting the first order of K elements into the second order includes generating a permutation identifier as a function of the pass counter, and the permutation identifier identifies one of K permutations of K data elements.

4. The method of claim 3, wherein the function for generating the permutation identifier includes performing a first checksum operation over digits of a base K representation of the pass counter, the first checksum operation produces a base K digit that in combination with all but one of the base K digits of the pass counter determines a value of the one of the base K digits of the pass counter, and the pass counter is greater than or equal to 0 and less than N/K.

5. The method of claim 4, wherein the first checksum operation is a modulo K sum of the digits of the base K representation of the pass counter.

6. The method of claim 4, wherein the first checksum operation is a bitwise XOR of a binary representation of the digits of the base K representation of the pass counter.

7. The method of claim 4, wherein the step of writing N/K input data elements to respective ones of K addressable memories comprises:
   performing for each of the input data elements a second checksum operation over digits of a base K representation of J, J being an index to N data elements, the second checksum operation produces a memory identifier that is a base K digit that in combination with all but one of the base K digits of J determines a value of the one of the base K digits of J, and J is greater than or equal to 0 and less than N/K, wherein the memory identifier is associated with one of the addressable memories;
   generating an element address for each element, the address including all but one digit from the base K representation of J; and
   assigning each data element to the element address in the memory associated with the memory identifier.

8. The method of claim 7, wherein the second checksum operation is a modulo K sum of the digits of the base K representation of J.

9. The method of claim 8, wherein the element address is J modulo N/K, whereby all but the most significant digit from the base K representation of J is included in the element address.

10. The method of claim 7, wherein the second checksum operation is a bitwise XOR of a binary representation of the digits of the base K representation of J.

11. The method of claim 10, wherein the element address is J/K, wherein integer division is used to calculate J/K, whereby all but the least significant digit from the base K representation of J is included in the element address.

12. The method of claim 7, wherein the element address is J modulo N/K, whereby all but the most significant digit from the base K representation of J is included in the element address.

13. The method of claim 7, wherein the element address is J/K, wherein integer division is used to calculate J/K, whereby all but the least significant digit from the base K representation of J is included in the element address.

14. A method for associating data elements of an N-point FFT with K addressable memories, wherein N is greater than or equal to 8 and K is greater than or equal to 2, comprising:
   mapping each data element with data element index J to an element memory of the K addressable memories using a checksum operation over digits of a base K representation of J, wherein the checksum operation produces a base K digit that in combination with all but one of the base K digits of J determines a value of the one of the base K digits of J, and J is greater than or equal to 0 and less than N;
   assigning each data element an element address that includes all but one digit from the base K representation of J; and
   accessing a data element in the element memory at the element address.

15. The method of claim 14, wherein the checksum operation is a modulo K sum of the digits of the base K representation of J.

16. The method of claim 15, wherein the element address is J modulo N/K, whereby all but the most significant digit from the base K representation of J is included in the element address.

17. The method of claim 14, wherein the checksum operation is a bitwise XOR of a binary representation of the digits of the base K representation of J.

18. The method of claim 17, wherein the element address is J/K, wherein integer division is used to calculate J/K, whereby all but the least significant digit from the base K representation of J is included in the element address.

19. The method of claim 14, wherein the element address is J modulo N/K, whereby all but the most significant digit from the base K representation of J is included in the element address.

20. The method of claim 14, wherein the element address is J/K, wherein integer division is used to calculate J/K, whereby all but the least significant digit from the base K representation of J is included in the element address.

21. An apparatus for performing a fast-Fourier transform (FFT) of N input data elements using a radix K decomposition of the FFT, wherein K is greater than or equal to 2, and N is greater than or equal to 8, comprising:
  means for writing N/K input data elements to respective ones of K addressable memories;
  means for performing $N/K * \log_K N$ passes, each pass including (a)-(f),
  (a) generating K respective addresses for the K addressable memories;
  (b) reading K data elements in parallel from the K addressable memories using the respective addresses, the K data elements being in a first order corresponding to the respective memories;
  (c) permuting the first order of K data elements into a second order of K data elements;
  (d) performing a radix K calculation on the second order of K data elements, resulting in corresponding result data elements in the second order;
  (e) permuting the second order of K result data elements into the first order; and
  (f) writing the K result data elements in parallel to the corresponding K addressable memories using the respective addresses; and
  means for reading N/K data elements from respective ones of K addressable memories.

22. A system for performing a fast-Fourier transform (FFT) of N input data elements using a radix K decomposition of the FFT, wherein K is greater than or equal to 2, and N is greater than or equal to 8, comprising:
  K addressable memories adapted to receive as input N/K data elements;
  a first control arrangement coupled to the addressable memories, the first control arrangement configured to generate K respective addresses for the K addressable memories, read K data elements in parallel from the K addressable memories using the respective addresses, the K data elements being in a first order corresponding to the respective memories, and permute the first order of K data elements into a second order of K data elements;
  at least one radix engine coupled to the first control arrangement, the radix engine configured to perform a radix K calculation on the second order of K data elements;
  a second control arrangement coupled to the addressable memories and to the radix engine, the second controller arrangement configured to permute the second order of K result data elements into the first order, and write the K result data elements in parallel to the corresponding K addressable memories using the respective addresses; and
  a third control arrangement coupled to the memories, to the first and second control arrangements, and to the radix engine, the third control arrangement configured to control a number of iterations by the first and second control arrangements and the radix engine before outputting N/K data elements from respective ones of K addressable memories and inputting N/K new data elements.

23. A system for performing a fast-Fourier transform (FFT) of N input data elements using a radix K decomposition of the FFT, wherein K is greater than or equal to 2, and N is greater than or equal to 8, comprising:
  at least one programmable logic device configured to include,
    K addressable memories adapted to receive as input N/K data elements;
    a first control arrangement coupled to the addressable memories, the first control arrangement configured to generate K respective addresses for the K addressable memories, read K data elements in parallel from the K addressable memories using the respective addresses, the K data elements being in a first order corresponding to the respective memories, and permute the first order of K data elements into a second order of K data elements;
    at least one radix engine coupled to the first control arrangement, the radix engine configured to perform a radix K calculation on the second order of K data elements;
    a second control arrangement coupled to the addressable memories and to the radix engine, the second controller arrangement configured to permute the second order of K result data elements into the first order, and write the K result data elements in parallel to the corresponding K addressable memories using the respective addresses; and
    a third control arrangement coupled to the memories, to the first and second control arrangements, and to the radix engine, the third control arrangement configured to control a number of iterations by the first and second control arrangements and the radix engine before outputting N/K data elements from respective ones of K addressable memories and inputting N/K new data elements.

* * * * *